(12) United States Patent  (10) Patent No.: US 7,012,933 B2
Mark et al.  (45) Date of Patent: Mar. 14, 2006

(54) ENHANCED PACKET NETWORK AND METHOD FOR CARRYING MULTIPLE PACKET STREAMS WITHIN A SINGLE LABEL SWITCHED PATH

(75) Inventors: Barry Ding Ken Mark, Ottawa (CA); Douglas Heath Patriarche, Ottawa (CA)

(73) Assignee: Tropic Networks Inc., Kanata, Ontario (CA)

( * ) Notice: Subject to any disclaimer, the term of this patent is extended or adjusted under 35 U.S.C. 154(b) by 963 days.

(21) Appl. No.: 10/025,872

(22) Filed: Dec. 26, 2001

(65) Prior Publication Data

US 2003/0118019 A1   Jun. 26, 2003

(51) Int. Cl.
*H04J 1/00* (2006.01)

(52) U.S. Cl. ..................... 370/487; 370/535

(58) Field of Classification Search ........ 370/352–358, 370/360, 366, 386, 389, 395.5, 395.52, 400, 370/401, 402, 411, 471, 478, 487, 490, 532, 370/535, 537
See application file for complete search history.

(56) References Cited

U.S. PATENT DOCUMENTS

2002/0103924 A1 * 8/2002 Nomura ...................... 709/235
2004/0202148 A1 * 10/2004 Kuehnel ..................... 370/352

OTHER PUBLICATIONS

10 Gigabit Ethernet Alliance, Technology Overview, White Paper, 1300 Bristol Street North, Newport Beach, CA 92660, U.S.A. www.10gea.org.

Rosen, E., et al, Network Working Group, "MPLS Label Stack Encoding", Jan. 2001 http://www.ietf.org/rfc/rfc3032.txt?number=3032.

Rosen, E., et al, Network Working Group, "Multiprotocol Label Switching Architecture", Jan. 2001 http://www.ietf.org/rfc/rfc3031.txt?number=3031.

Malis, A., et al, Network Working Group, "PPP over SONET/SDH", Jun. 1999 http://www.ietf.org/rfc/rfc2615.txt?number=2615.

Simpson, W., editor, Daydreamer, Jul. 1994, Network Working Group, "PPP in HDLC-like Framing", http://www.ietf.org/rfc/rfc1662.txt?number=1662.

Simpson, W., editor, Daydreamer, Jul. 1994, Network Working Group, "The Point-to-Point Protocol (PPP)" http://www.ietf.org/rfc/rfc1661.txt?number=1661.

* cited by examiner

*Primary Examiner*—Brenda Pham
(74) *Attorney, Agent, or Firm*—Victoria Donnelly

(57) ABSTRACT

A method of transmitting packets from the source edge router through the label switch router to the destination edge router, comprising the steps of:
  assigning different protocol type indicators at the source edge router to user MPLS packets and to non-user MPLS packets of at least one additional protocol type;
  at the label switch router, forwarding MPLS packets received from the source edge router or another label switch router in such a manner as to preserve the protocol type indicator of the packet transport protocol of each received MPLS packet;
  at the destination edge router, recognizing the protocol type indicator of the transport protocol of the MPLS packets received from the label switch router, and segregating the user MPLS packets from non-user MPLS packets. Preferably, user and non-user MPLS packets are assigned the same MPLS label and sent via the same label switched path. Corresponding enhanced MPLS network is also provided.

20 Claims, 8 Drawing Sheets

ENHANCED PACKET NETWORK AND METHOD FOR CARRYING MULTIPLE PACKET STREAMS WITHIN A SINGLE LABEL SWITCHED PATH

FIELD OF THE INVENTION

The invention relates to communications networks, and in particular, to a packet network and a method for carrying multiple packet streams within a single label switched path.

BACKGROUND OF THE INVENTION

A commonly used standard packet transport protocol for the transmission of data packets over fiber links is POS, where POS is an acronym for "PPP Over SONET", PPP is an acronym for "Point-to-Point Protocol", and SONET is an acronym for "Synchronous Optical NETwork".

PPP provides an encapsulation for variable length packets transmitted from a sending terminal to a receiving terminal. PPP is described in more detail in the IETF (internet engineering task force) documents RFC 1661 and RFC 1662. POS provides the adaptation of a PPP packet to meet the requirements of the SONET standard. POS is described in more detail in the IETF document RFC 2615.

Several other fiber transport protocols exist for transmitting data packets over fiber links. For example, the proposed Gigabit Ethernet WAN (Wide Area Network) standard (10 Gigabit Ethernet Technology Overview White Paper, http://www.10gea.org/10GEA_Whitepaper_0901.pdf) provides similar capabilities for carrying data packets as does the POS standard.

MPLS (Multiprotocol Label Switching) is a protocol used in high speed data packet networks to provide efficient routing and switching of packets. In an MPLS network, packets are assigned a label (by a label edge router) and forwarded along a label switched path (LSP) where each label switch router (LSR) makes forwarding decisions based on the contents of the label. One of the capabilities of MPLS is the ability to create end-to-end circuits with specific performance characteristics. The MPLS architecture is described in IETF document RFC 3031. The MPLS label mechanism is described in IETF document RFC 3032.

The Internet protocol (IP) is the most common networking protocol providing end-to-end user packet networks. MPLS networks are used to build high capacity and high performance backbone networks linking IP networks.

While MPLS and POS protocols provide the basis for building fiber based packet networks which can forward IFP user packets, there is also a requirement in such networks to provide OAM&P (Operations, Administration, Maintenance, and Provisioning) capabilities which permit the operator of the network to interrogate and control the operation of the network.

As part of the OAM&P functionality, it is advantageous in high performance networks to be able to monitor network performance in real time in order to detect any deterioration of the expected performance. This is especially important in MPLS networks where the minimum performance of a user connection may be specified in a service level agreement between the network operator and the user. Performance parameters of interest include packet loss, end-to-end packet delay, and delay variation.

One method of determining network performance is the collection of statistics by the network nodes. This method can provide summary or detailed packet loss information, but is not appropriate for monitoring delay parameters. This method also requires a great deal of processing of all packets if detailed (per connection) information is to be gathered, and does not lend itself to real time monitoring.

Another method is to send test packets through the network. The disadvantage of this method is that test packets must either have different labels (in an MPLS network) or different IP destination addresses, in order to be distinguishable from the user data. If they have different labels, they require additional network resources (labels are a limited resource) and it would be difficult to guarantee that the test traffic will be subject to exactly the same degradation as the user traffic. If the method is based on different IP destination addresses, additional processing in the forwarding path is required, leading to greater expense or lower throughput.

MPLS provides the general capability of inserting more than one label in each packet (known as a label stack). This capability could be used to provide an additional label to differentiate between the user data stream from the OAM&P packets, but at the expense of the additional label (an increase in packet overhead), and the additional label insertion and decoding step in the edge routers (additional processing in the forwarding path).

Therefore there is a need for the development of the enhanced network and method of transmitting the data through the network, which would provide additional capabilities without using additional resources in the network.

SUMMARY OF THE INVENTION

An objective of the invention is to provide a method and an enhanced network, which would provide carrying multiple packet streams within a single label switched path.

According to one aspect of the invention there is provided a multi-protocol label switching (MPLS) packet network, having at least one source edge router, at least one label switch router, and at least one destination edge router connected by transmission links, and using a packet transport protocol providing a protocol type indicator of the transported packet, the network comprising:

means for assigning different protocol type indicators for user MPLS packets and non-user MPLS packets of at least one additional protocol type;

means at the source edge router for transmitting the non-user MPLS packets;

means at the label switch router for forwarding MPLS packets received from the source edge router or from another label switch router in such a manner as to preserve the protocol type indicator of the packet transport protocol of each received MPLS packet;

means at the destination edge router for recognizing the protocol type indicator of the transport protocol of the MPLS packets received from the label switch router and means for segregating the user MPLS packets from non-user MPLS packets.

Preferably, the means at the source edge router for transmitting the non-user MPLS packets of the additional protocol type comprises a means for transmitting the non-user MPLS packets of said additional protocol type with the same MPLS labels as user MPLS packets. Accordingly, the means for segregating the user MPLS packets from non-user MPLS packets comprises a means for segregating, based on said protocol type, MPLS packets received with the same MPLS label. Conveniently, the source edge router further comprises a means for sending non-user MPLS packets to the destination edge router, using the same label switched path as for the user MPLS packets.

The means for transmitting non-user MPLS packets may comprise means for transmitting signalling frames, OAM&P (operations, administration, maintenance and provisioning) frames or other non-user types of frames between the edge routers. Conveniently, the network further comprises a means for monitoring said label switched path by using said OAM&P frames.

Beneficially, the source edge router comprises processing means for generating non-user MPLS packets, and the destination router comprises processing means for receiving and analyzing received non-user MPLS packets.

The described enhanced network may use one of the following transport protocols: Point-to-point over SONET (POS), Gigabit Ethernet or Internet Protocol (IP).

According to another aspect of the invention there is provided a method for transmitting packets in an MPLS packet network comprising at least one source edge router, at least one destination edge router and at least one label switch router connected by transmission links and using a packet transport protocol providing a protocol type indicator of the transported packet, the method of transmitting packets from the source edge router through the label switch router to the destination edge router, comprising the steps of:

assigning different protocol type indicators at the source edge router to user MPLS packets and to non-user MPLS packets of at least one additional protocol type, at the label switch router, forwarding MPLS packets received from the source edge router or another label switch router in such a manner as to preserve the protocol type indicator of the packet transport protocol of each received MPLS packet; and at the destination edge router, recognizing the protocol type indicator of the transport protocol of the MPLS packets received from the label switch router, and segregating the user MPLS packets from non-user MPLS packets.

Advantageously, the step of transmitting the traffic comprises transmitting the non-user MPLS packets of said additional protocol type with the same MPLS labels as user MPLS packets. Correspondingly, the step of segregating the user MPLS packets from non-user MPLS packets comprises segregating, based on said protocol type, MPLS packets having the same MPLS label. Conveniently, the method provides transmission of non-user packets from the source edge router to the destination edge router using the same label switched path as for the user MPLS packets. The method can be applied for the transmission of different types of traffic (MPLS packets) such as IP traffic, OAM&P (operations, administration, maintenance and provisioning) traffic or signalling traffic.

According to another aspect of the invention there is provided an edge router for an multi-protocol label switching (MPLS) network, including the edge router and at least one label switch router connected by transmission links and using different protocol type indicators of the transported packets for user MPLS packets and non-user MPLS packets of at least one additional protocol type, the router comprising:

means for transmitting the non-user MPLS packets;

means for recognizing the protocol type indicator of the transport protocol of the MPLS packets received from the label switch router; and means for segregating the user MPLS packets from non-user MPLS packets.

Beneficially, the means for transmitting the MPLS packets comprises a multiplexer for multiplexing user and non-user MPLS packets and assigning same MPLS label to the user and non-user packets. Conveniently, the edge router may be used as the source edge router.

In the described edge router, the means for segregating the user and non-user MPLS packets may comprise a demultiplexer, which provides segregation of said packets based on the assigned protocol type indicators. Such router can be used as the destination edge router.

According to yet another aspect of the invention there is provided a label switch router for a multi-protocol label switching (MPLS) network, including at least one edge router and the label switch router connected by transmission links and using different protocol type indicators of the transported packets for user MPLS packets and non-user MPLS packets of at least one additional protocol type, the label switch router comprising:

means for forwarding MPLS packets received from the edge router or from another label switch router in such a manner as to preserve the protocol type indicator of the packet transport protocol of each received MPLS packet.

The method and enhanced network providing sending of different type of MPLS traffic along same MPLS path, e.g. sending test traffic, allows a direct observation of the performance of a user's connection through the network. For example, when used for signalling, the method permits the establishment of a signalling path over an existing path through a network. This is a more efficient use of resources than if additional paths for signalling were established.

BRIEF DESCRIPTION OF THE DRAWINGS

The invention will now be described in greater detail with reference to the attached drawings, in which.

DETAILED DESCRIPTION

Figure 1:
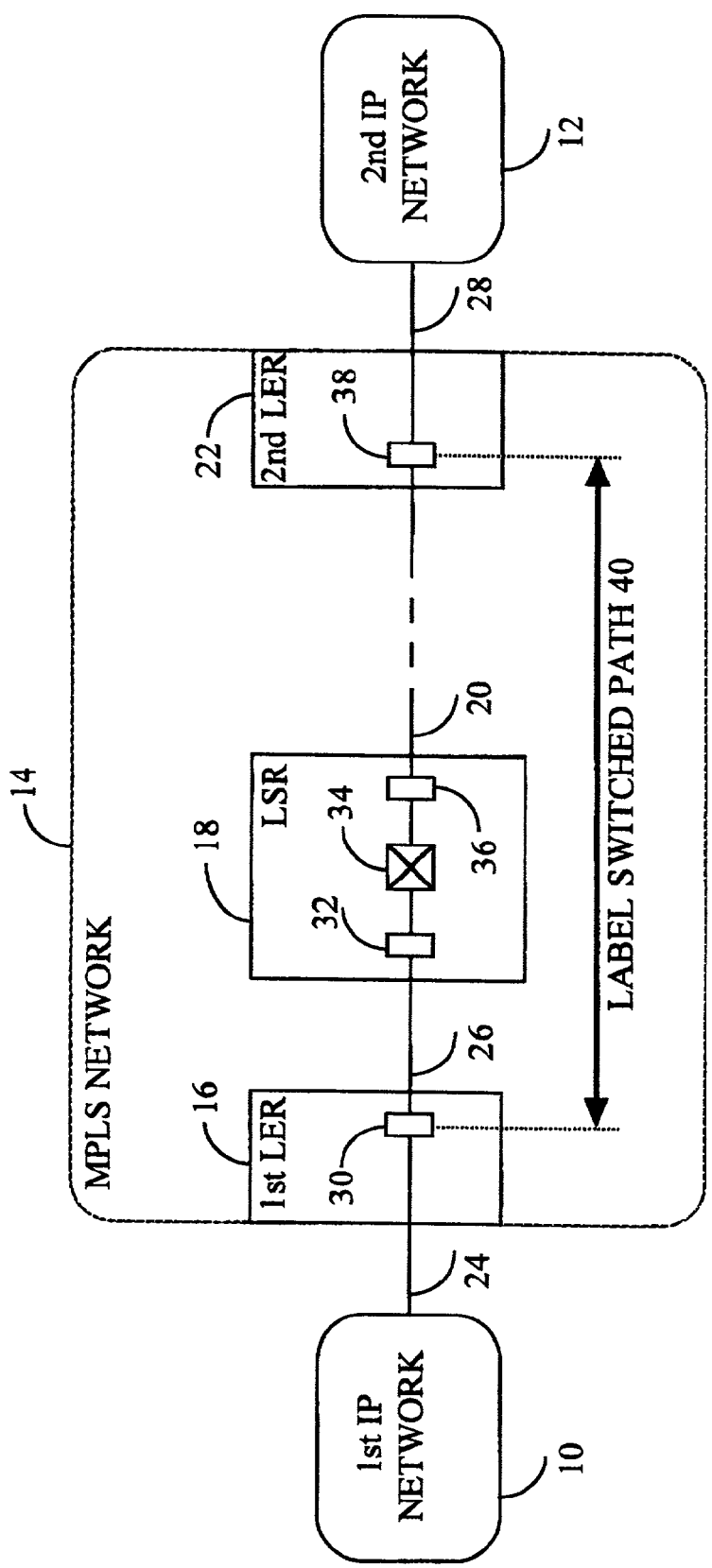
FIG. 1 shows an MPLS network of the prior art providing a data path between two IP networks.

FIG. 1 shows an MPLS network of the prior art, illustrating an exemplary data path between two IP networks through an MPLS network. Packets originating in a first IP network 10, and destined for a second IP Network 12 are transmitted through an MPLS network 14. Only one direction of traffic flow is described, it being understood that traffic flow in the opposite direction is handled by similar means as the direction described.

The MPLS network includes a first label edge router (LER) 16 acting as a source edge router, at least one label switch router (LSR) 18, and a second label edge router (LER) 22 acting as a destination edge router. The first IP network 10 is connected to the first LER 16 with link 24. The first LER 16 is connected to the LSR 18 with link 26. The LSR 18 is connected to the second LER 22 with link 20, link 20 possibly extending through additional LSRs as indicated by the dashed line. The second LER 22 is connected to the second IP network 12 with link 28.

The links 24 and 28 carry IP data packets encapsulated in a protocol suitable for the links 24 and 28. Such protocols include Ethernet, ATM, POS and others.

The LERs form the edge of the MPLS network. The links 26 and 20 between LERs and LSRs are fiber links using a SONET signal format. Although other fiber link signal formats may also be used, such as a Gigabit Ethernet signal, the detailed description of the prior art and of the preferred embodiment of the invention will be based on SONET, specifically PPP over SONET (POS).

As is the nature of networks, an MPLS network would normally contain connections to additional IP networks, additional label edge routers, and additional label switch routers, but for clarity of the description, only a simple path from a first IP network to a second IP network is shown.

Figure 2:
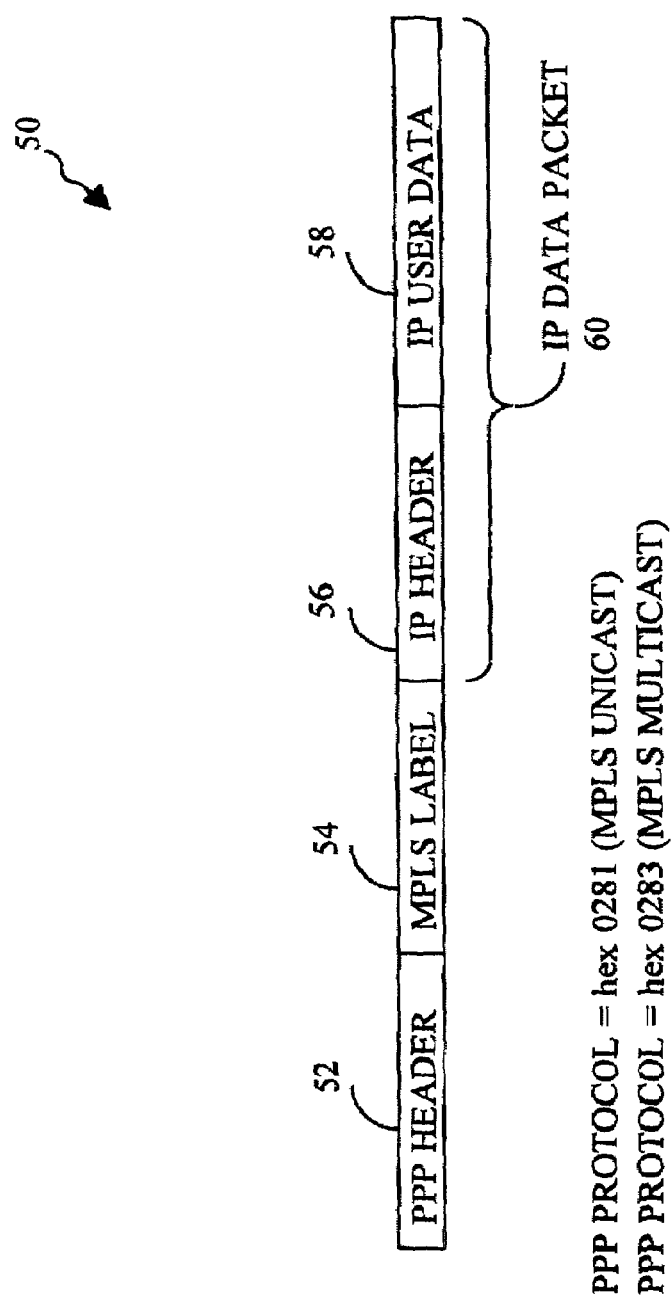
FIG. 2 illustrates the format of a PPP packet of the prior art.

FIG. 2 illustrates the format of a typical PPP packet 50 of the prior art.

The PPP packet 50 includes a PPP header 52, an MPLS label 54, an IP header 56, and IP user data 58. The IP header 56 and the IP user data 58 together form an IP packet 60. For transmission over a SONET link using the POS protocol, the packet undergoes additional transformation steps as detailed in the POS standard (RFC 2615) but not illustrated in FIG. 2. These steps include the generation of a Frame Check Sequence (FCS) to be appended to the packet, a byte stuffing operation, and scrambling, before insertion in the SONET framing structure.

IP data packets 60 are received over link 24 by the first LER (16) in FIG. 1. The first LER contains a label multiplexer 30 which transforms the IP data packets into PPP packets (PPP packet format 50) by the addition of the MPLS label 54, and the PPP header 52. The PPP header contains a protocol type identifier, which indicates the type of enclosed protocol; in the present case, the enclosed protocol is MPLS. The value of the protocol type identifier for MPLS is given in RFC 3032 as hexadecimal 0281 (MPLS unicast) or hexadecimal 0283 (MPLS multicast).

The first label edge router 16 outputs PPP packets in SONET format (POS) on its output link 26 to the label switch router 18. The label switch router LSR 18 contains an ingress label demultiplexer 32, a switching fabric 34, and an egress label multiplexer 36.

The LSR 18 receives PPP packets in SONET format (POS) from link 26. After extracting the PPP packet from the SONET framing structure, the ingress label demultiplexer 32 checks the protocol type identifier in the PPP header which must indicate MPLS, and uses the incoming MPLS label to route the packet through the switching fabric 34, the LSR further determines an outgoing MPLS label in accordance with the MPLS standards described in RFC 3031 and RFC 3032. The egress label multiplexer generates an outgoing PPP packet, which has a PPP header with the correct (MPLS) protocol type identifier, the outgoing MPLS label and a copy of the incoming IP data packet. The LSR 18 outputs the outgoing PPP packets in SONET format (POS) on its output link 20 to the second label edge router 22 or, as indicated by the dashed line 20 in FIG. 3, to one or more additional label switch routers. Each additional label switch routers in the path performs the same sequence of functions as the LSR 18.

The second label edge router (LER 22) includes an egress label demultiplexer 38. The LER 22 receives PPP packets in SONET format (POS) from the LSR 18 (or an additional LSR) over link 20. The egress label demultiplexer 38 verifies and drops the PPP header and the MPLS label from the PPP packets received from the LSR in the MPLS network, and delivers the extracted IP data packets to the (second) IP network over link 28.

The path taken by PPP packets starting at the ingress label multiplexer 30 in the first LER and ending at the egress label demultiplexer 38 in the second LER, where the packets use one set of assigned MPLS labels, is known as a label switched path (LSP 40). In typical usage, the traffic from a user in the first IP network to a user in the second IP network will be assigned to a dedicated LSP, different LSPs being assigned for different routes, different performance requirements, and other characteristics of the user traffic.

The description of the MPLS network of the prior art has been provided for illustrative purposes, and as a basis upon which the novel features of the invention are introduced to enhance the usefulness of a packet network based on the MPLS protocol.

Figure 3:
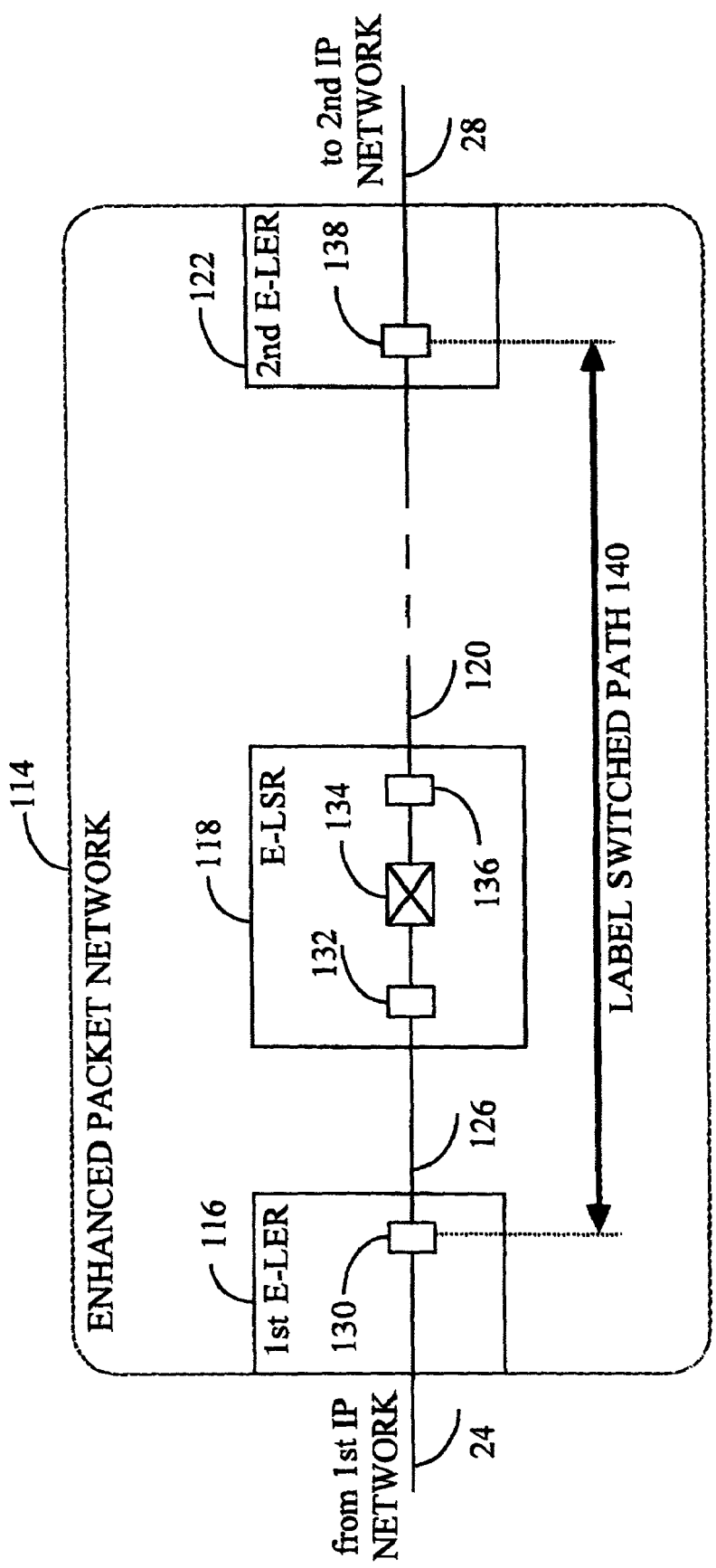
FIG. 3 shows an enhanced packet network of the embodiment of the invention, including enhanced label edge routers and an enhanced label switch router.

The preferred embodiment of the enhanced packet network 114 of the invention is shown in FIG. 3.

FIG. 3 resembles the MPLS network of the prior art (FIG. 1), but the label edge routers (first LER 16 and second LER 22) and the label switch router (LSR 18) of the prior art are replaced by enhanced label edge routers (first E-LER 116 and second E-LER 122) and an enhanced label switch router (E-LSR 118) of the invention.

The enhanced packet network 114 receives IP data packets from the first IP network over link 24, and sends the routed IP data packets to the second IP network over link 28, as in the prior art. The enhancement of the preferred embodiment of the invention is internal to the enhanced packet network 114. In addition to providing user IP data packets over a given label switched path 140, the enhanced packet network has the capability of sending additional packets (OAM frames and signalling frames) from the first E-LER 116 to the second E-LER 122 over the same label switched path 140 as the user IP data packets.

Figure 4:
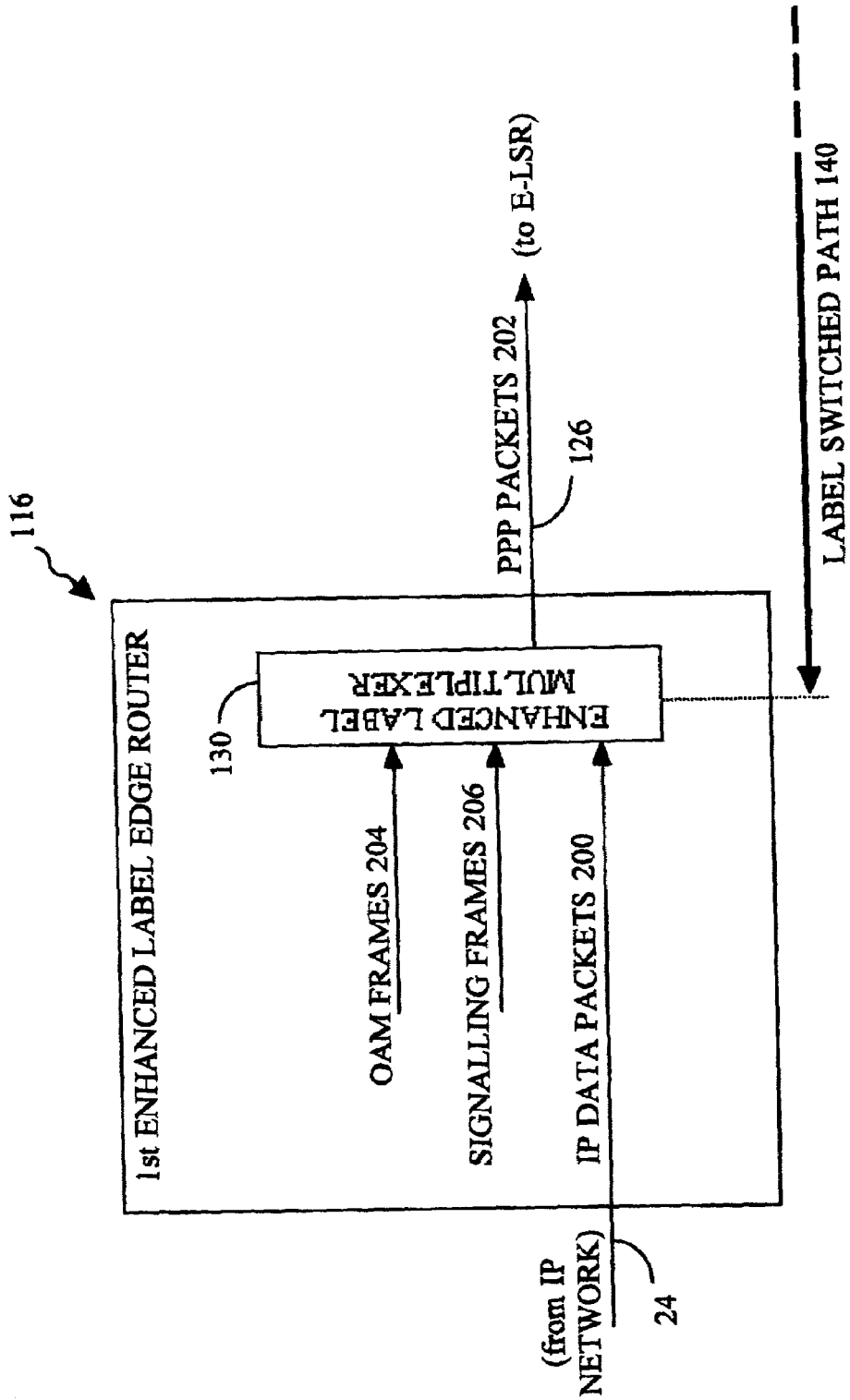
FIG. 4 shows the first enhanced label edge router of the enhanced packet network of FIG. 3.

The first enhanced label edge router (E-LER) 116 is shown in detail in FIG. 4. It contains an enhanced label multiplexer 130. One of the functions of the enhanced label multiplexer 130 is similar to the corresponding function of the label multiplexer 30 (FIG. 1) of the prior art: the enhanced label multiplexer 130 receives user IP data packets 200 on link 24 and converts them to PPP packets 202, to be sent out on link 126. In addition, the enhanced label multiplexer 130 accepts OAM frames 204 and signalling frames 206 which are also converted to PPP packets 202.

FIGS. 5A, 5B, and 5C illustrate the format of the PPP packet 202 which is capable of carrying three types of data packets while using a common MPLS label 208.

FIG. 5A is equivalent to FIG. 2 showing the PPP packet 202 containing a user IP data packet 200 prefixed with MPLS label 208 and PPP header 210. The protocol type identifier in the PPP header is hexadecimal 0281 or hexadecimal 0283 to indicate MPLS unicast and multicast respectively.

FIG. 5B shows an OAM frame 204 being carried in the PPP packet 202, identified by the protocol identifier hexadecimal 0E07.

In FIG. 5C, a signalling frame 206 is carried in the PPP packet 202, identified by the protocol identifier hexadecimal 0E01.

The enhanced LSR (E-LSR) 118 (FIG. 3) contains the label switching functions of a conventional LSR of the prior art. It may be recalled that a conventional LSR uses the PPP header protocol identifier to verify that a PPP packet carries the MPLS protocol. The conventional LSR then uses the MPLS label for routing.

In the E-LSR, the label switching function is enhanced to also perform MPLS switching when the PPP header indicates certain other protocol types. In the preferred form of the E-LSR, new protocol identifier values hexadecimal 0E07 and hexadecimal 0E01 are recognized, and label switching is performed for PPP packets carrying the new protocol identifiers in the same way as if a PPP packet containing the MPLS unicast identifier (hexadecimal 0281) had been received.

Figure 5:
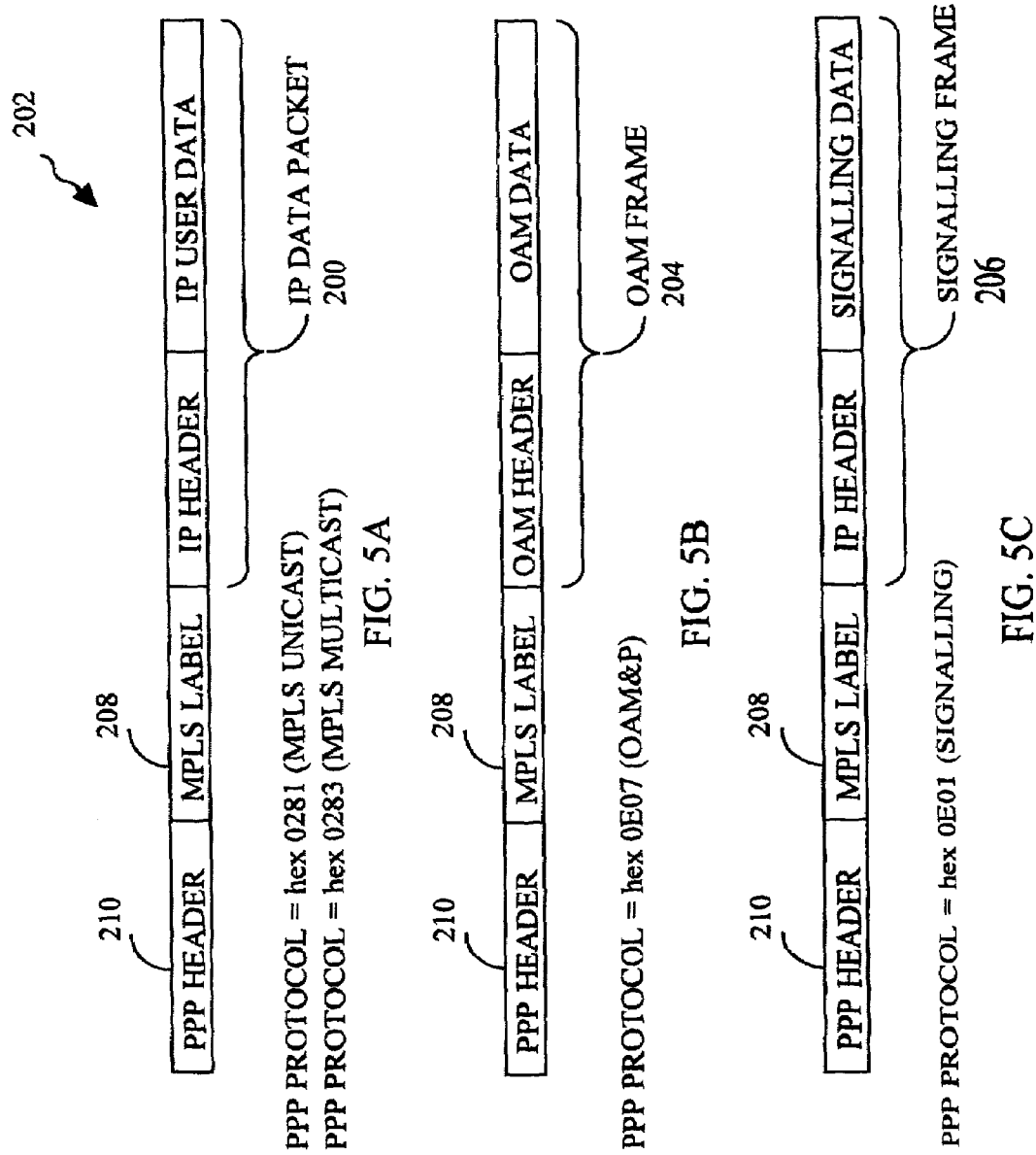
FIGS. 5A, 5B and 5C illustrate formats of PPP packets for carrying IP data, OAM data and signalling data respectively in the network of FIG. 3.
Figure 6:
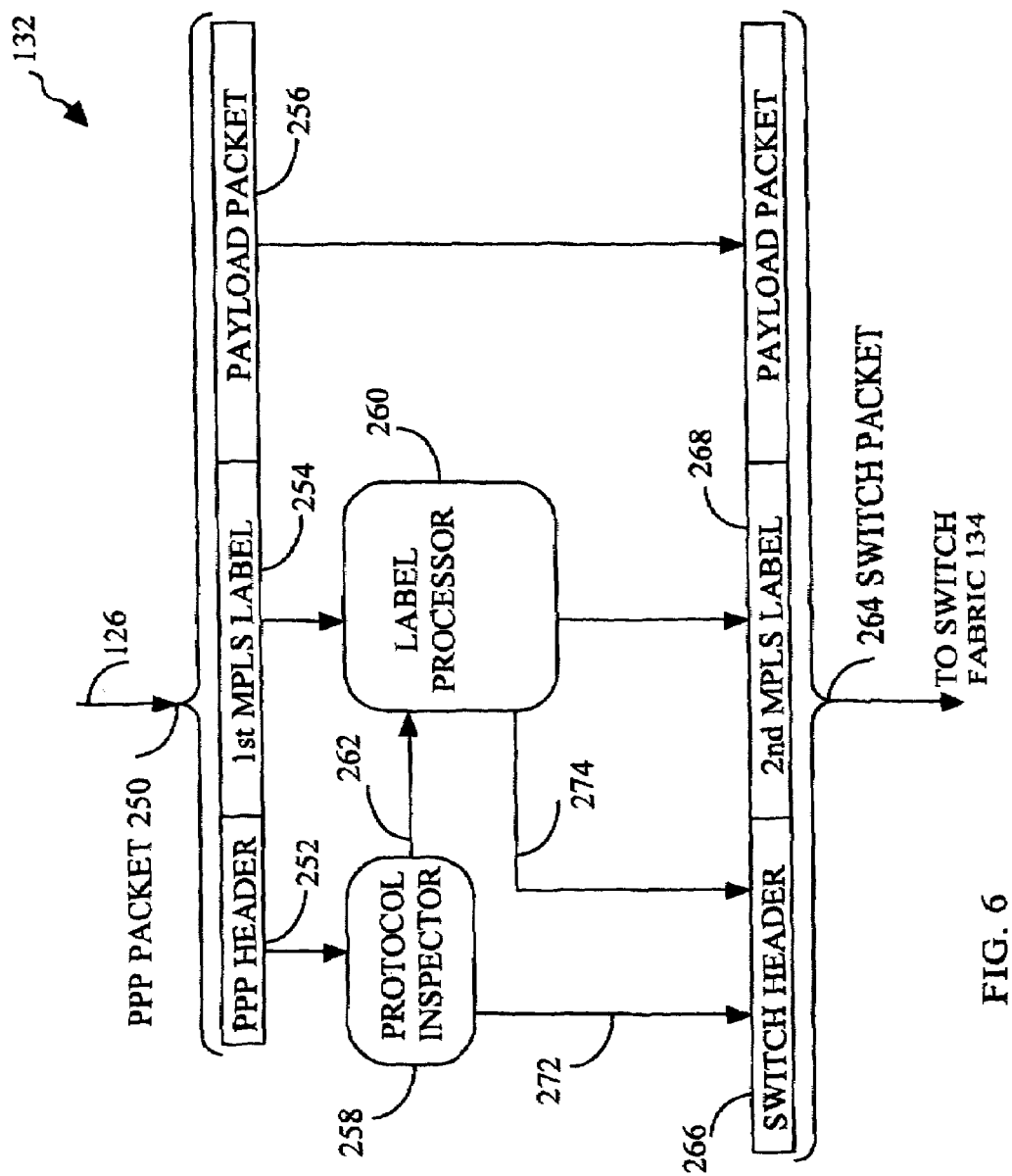
FIG. 6 shows a detailed structure of the ingress label demultiplexer of the enhanced label switch router.

In FIG. 6 is illustrated a preferred form of the ingress label demultiplexer 132 of the enhanced LSR 118. PPP over SONET packets are received over link 126. The received PPP packet 250 includes a PPP header 252, a first MPLS label 254, and a payload packet 256. The PPP header includes one of the recognized protocol type identifiers. The payload packet is either an IP data packet 200, an OAM frame 204 or a signalling frame 206, depending on the protocol type indicated in the associated PPP header, as was illustrated in FIG. 5.

The PPP header 252 is input to a protocol inspector 258. The first MPLS label 254 is one of the inputs to a label processor 260. The other input of the label processor is connected to an output 262 of the protocol inspector 258.

The output of the ingress label demultiplexer 132 is a switch packet 264 which contains a switch header 266, a second MPLS label 268, and a copy of the payload packet 256. The switch packet 264 is sent to the switch fabric 134 of the enhanced label switch router 118 (in FIG. 3).

The switch header 266 serves a number of purposes related to the operation of the switch fabric as is customary in the design of packet switches. The switch header is composed of a number of fields (not shown in detail), which receive numerical values via line 272 from the protocol inspector 258 and via line 274 from the label processor 260.

The second MPLS label 268 is output from the label processor 260. The generation of MPLS labels is covered by the MPLS specifications. This function is unchanged from the prior art.

The protocol inspector 258 is responsive to the protocol type field in the PPP header 252 and has two outputs:

output 262, connected to the label processor 260, enables label processing whenever the PPP header contains a protocol type indicating that the packet contains an MPLS header, including the cases when either IP data packets, OAM frames, or signalling frames are contained in the payload of the PPP packet 250;

output 272 indicates which of the protocol types was received in the PPP header. This information is encoded in the switch header, and will be carried and switched with the switch packet 264 through the switch fabric 134.

Output 274 of the label processor 260 contains the information required by the switch fabric 136 to route the switch packet 264 to the correct output. The form of this information is dependent on the switch fabric design, but generally is a fabric port address.

Figure 7:
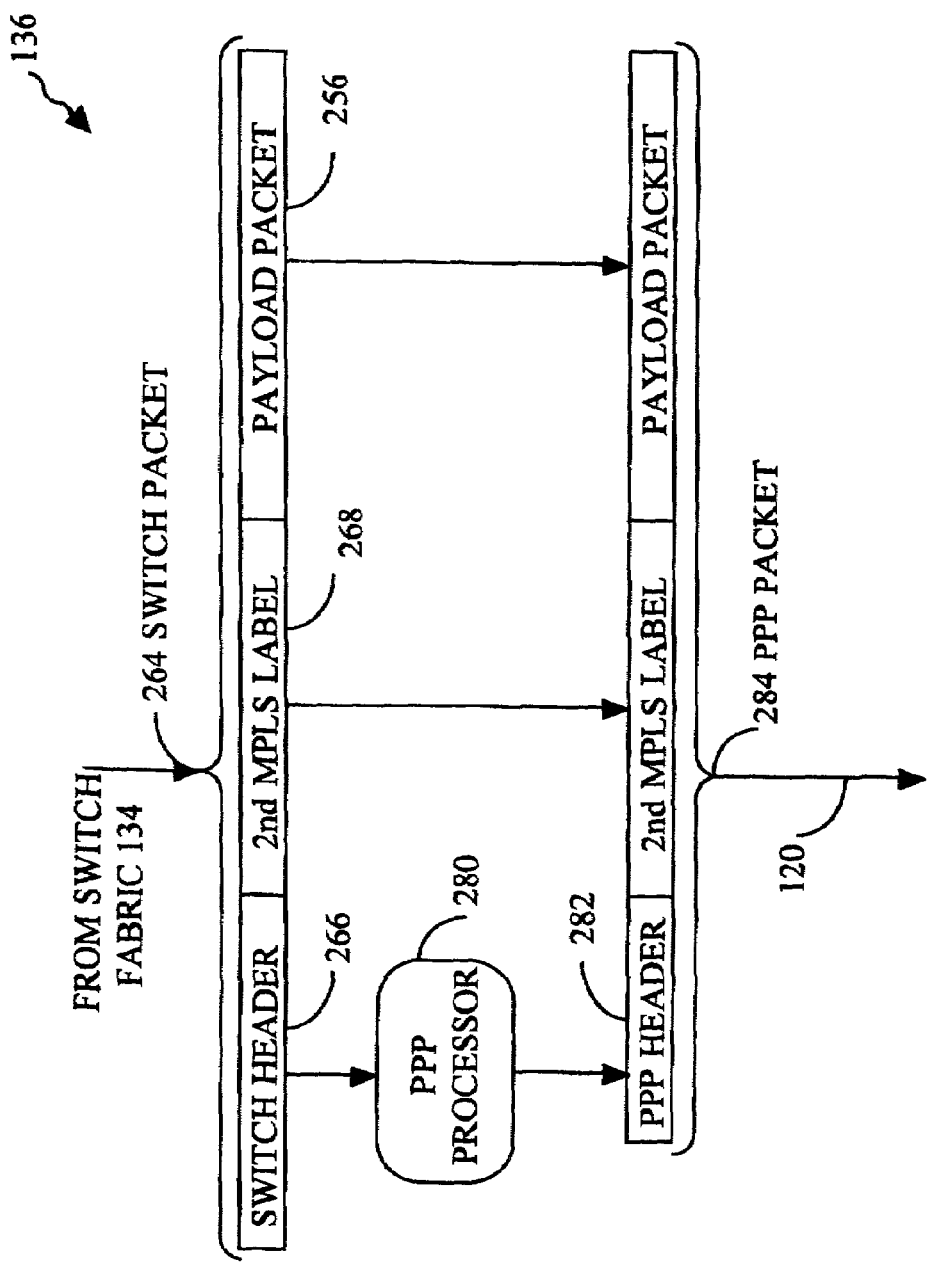
FIG. 7 shows a detailed structure of the egress label multiplexer of the enhanced label switch router.

The egress label multiplexer 136 is illustrated in FIG. 7. The switch packet 264 received by the egress label multiplexer 136 from the switch fabric 134 is unchanged from the switch packet 164 transmitted into the switch fabric by the ingress label demultiplexer 132. The switch header 266 is input to a PPP processor 280. The output of the PPP processor is a PPP header 282. The output of the egress label multiplexer 136 is a PPP packet 284 to be sent in SONET format (POS) on line 120.

The PPP packet 284 has the PPP header 282, a copy of the second MPLS label 268, and a copy of the payload packet 256. The PPP header 282 is generated by the PPP processor 280 from information contained in the switch header 266 which includes the encoded protocol type. The outgoing PPP packet 284 will be a copy of the incoming PPP packet 250 (FIG. 6) with the exception of the MPLS label where the first MPLS label 254 has been replaced by the second MPLS label 268, in accordance with the MPLS label switching mechanism.

It is worth noting that the PPP protocol type identifier in the outgoing PPP packet 284 is not (as in the prior art) just an MPLS protocol identifier, but is a copy of the protocol identifier present in the incoming PPP packet 250. Both, incoming PPP packet 250 and outgoing PPP packet 284, are instances of the PPP packet 202 whose format was described in FIG. 5.

Figure 8:
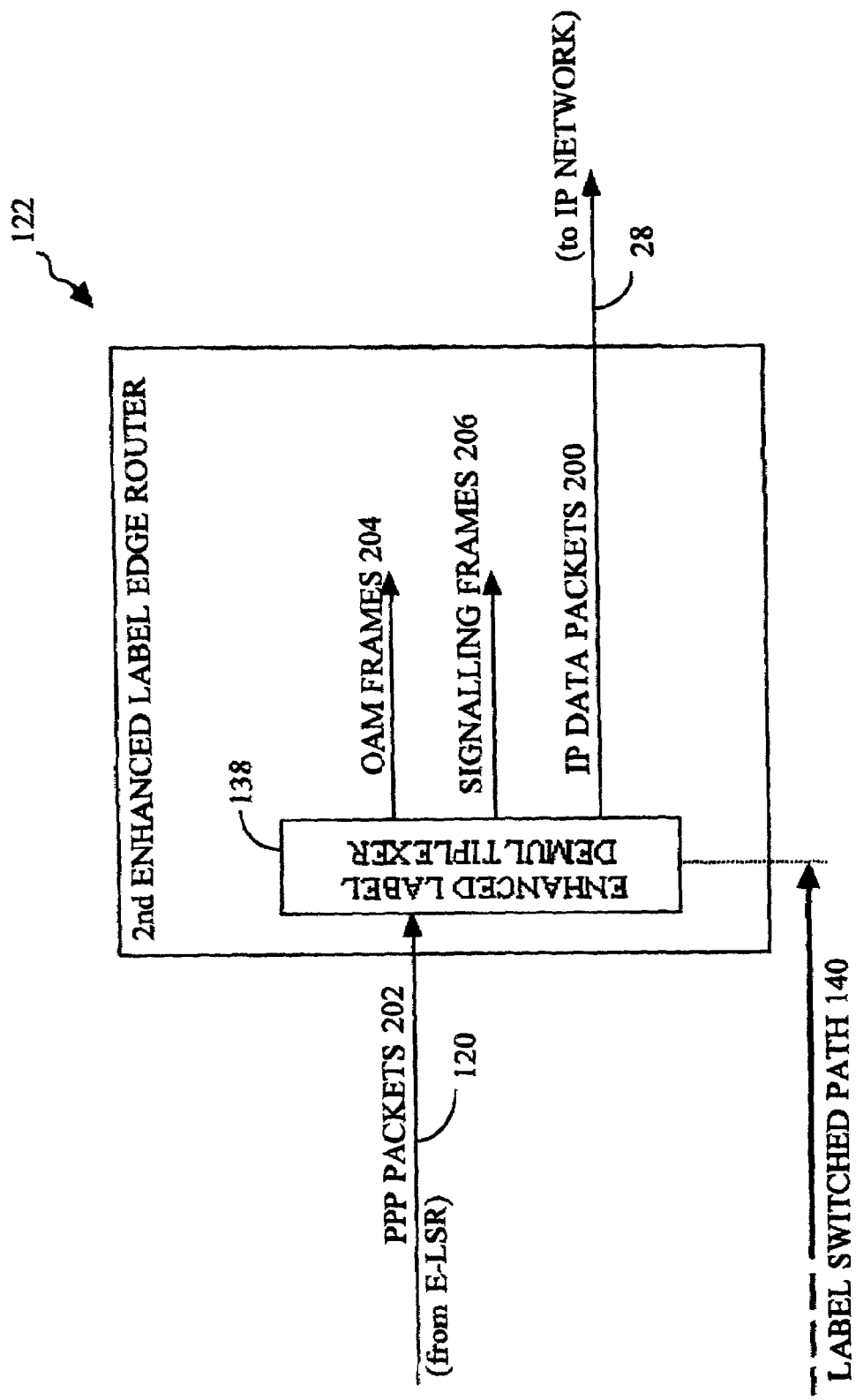
FIG. 8 shows the second enhanced label edge router of the enhanced packet network of FIG. 3.

FIG. 8 shows a block diagram of the second enhanced label edge router (E-LER 122 in FIG. 3) including an enhanced label demultiplexer 138. PPP over SONET packets are received from an enhanced label switch router, e.g. ELSR 118, over link 120. The PPP packets have the format of a PPP packet 202. The enhanced label demultiplexer 138 has outputs generating three types of signal: OAM frames 204, signalling frames 206, and IP data packets 200. The IP data packets 200 are output over line 28 to an IP network, e.g. the second IP network 12, while the OAM and signalling frames are available for use within the second enhanced label edge router 122 itself.

In functional terms, the enhanced label demultiplexer 138 evaluates the protocol type identifier contained the PPP header 210 in the PPP packet 202 (FIG. 5), strips the PPP header and the MPLS label, and generates the remaining packet as one of three types depending on the protocol type as illustrated in FIG. 5: a OAM frame 204 if the protocol type is hexadecimal 0E07; a signalling frame 206 if the protocol type is hexadecimal 0E01; or an IP data packet 200 if the protocol type is hexadecimal 0281 or hexadecimal 0283.

Summarizing the operation of the enhanced packet network 114 as a whole:

the E-LER 116 receives user IP data packets from an IP network, e.g. the first IP network 10, and inserts them into the label switched path (LSP) 140;

the E-LER 116 also has the ability to insert OAM frames and signalling frames in the same LSP 140;

the E-LSR 118, and all other E-LSRs (not shown) which together provide the label switched path (LSP) 140, forward packets with the PPP protocol type identifier unchanged;

the E-LER 122 extracts user IP data packets from the LSP 140 and forwards them to an IP network;

the E-LER 122 also has the ability to extract OAM frames and signalling frames from the same LSP 140.

It should be noted that at the time of this application, the proposed additional protocol type identifiers (hexadecimal 0E07 and 0E01) have not been standardized. A number of protocol types, including the MPLS identifiers (hexadecimal 0281 and 0283), have been standardized for the standard PPP header, however the protocol type field contains a large number of unused identifier values, and the new values proposed here are to be understood as exemplary values which are compatible with the values already standardized.

The use of these new protocol types permits the shared use (multiplexing) of a single label switched path for a number of additional packet streams in addition to the user traffic. Additional packet streams may be generated and received by the edge routers in the enhanced packet network, or more specifically by control processors therein or thereto attached.

In terms of applications, the additional packet streams provide the edge routers in the enhanced packet network with the ability to insert test traffic in the label switched path of a user connection, without this test traffic reaching the user.

A further use of additional packet streams in the enhanced packet network is to provide a MPLS signalling facility where the label switch routers in the network provide a single semi-permanent path carrying an aggregate of traffic between two MPLS routers requiring a router-to-router signalling capability. Using the capability of the enhanced packet network of sharing an existing label switched path for signalling is a more efficient use of resources than if the routers had to establish additional label switched paths for signalling between them.

The concept of the enhanced network and the methods employed therein to create a shared use of a label switched path with SONET fiber links and the PPP over SONET protocol, is readily applied to the case where other transport protocols are used such as the proposed Gigabit Ethernet WAN protocol. The Gigabit Ethernet WAN protocol, provides a protocol type field which can be used in the same manner as the PPP protocol type identifier, to multiplex OAM and signalling frames over a single MPLS label switched path along with user IP data packets.

Other modifications to the method and enhanced network, using shared label switched paths for purposes other than OAM and signalling will be apparent to persons skilled in the art, without limiting the application of the invented method and system to other situations.

Although specific embodiments of the invention have been described in detail, it will be apparent to one skilled in the art that variations and modifications to the embodiments may be made within the scope of the following claims.

We claim:

1. An multi-protocol label switching (MPLS) packet network, having at least one source edge router, at least one label switch router, and at least one destination edge router connected by transmission links, and using a packet transport protocol providing a protocol type indicator of the transported packet, the network comprising:
    means for assigning different protocol type indicators for user MPLS packets and non-user MPLS packets of at least one additional protocol type;
    means at the source edge router for transmitting the non-user MPLS packets;
    means at the label switch router for forwarding MPLS packets received from the source edge router or from another label switch router in such a manner as to preserve the protocol type indicator of the packet transport protocol of each received MPLS packet; and
    means at the destination edge router for recognizing the protocol type indicator of the transport protocol of the MPLS packets received from the label switch router and means for segregating the user MPLS packets from non-user MPLS packets.

2. The network of claim 1, wherein in the source edge router the means for transmitting the non-user MPLS packets of the additional protocol type comprises a means for transmitting the non-user MPLS packets of said additional protocol type with the same MPLS labels as user MPLS packets.

3. The network of claim 2, wherein the means for segregating the user MPLS packets from non-user MPLS packets comprises a means for segregating, based on said protocol type, MPLS packets received with the same MPLS label.

4. The network of claim 3, wherein the source edge router further comprises a means for sending non-user MPLS packets to the destination edge router, using the same label switched path as for the user MPLS packets.

5. The network of claim 4, wherein the means for transmitting non-user MPLS packets comprises means for transmitting signalling frames between the edge routers.

6. The network of claim 4, wherein the means for transmitting non-user MPLS packets comprises means for transmitting OAM frames between the edge routers.

7. The network of claim 6, the network further comprising a means for monitoring said label switched path by using said OAM frames.

8. The network of claim 4, wherein the source edge router comprises processing means for generating non-user MPLS packets, and the destination router comprises processing means for receiving and analyzing received non-user MPLS packets.

9. The network of claim 1, wherein the transport protocol is Point-to-point over SONET (POS).

10. The network of claim 1, wherein the transport protocol is Gigabit Ethernet.

11. In a MPLS packet network comprising at least one source edge router, at least one destination edge router and at least one label switch router connected by transmission links and using a packet transport protocol providing a protocol type indicator of the transported packet, a method of transmitting packets from the source edge router through the label switch router to the destination edge router, comprising the steps of:
    assigning different protocol type indicators at the source edge router to user MPLS packets and to non-user MPLS packets of at least one additional protocol type;
    at the label switch router, forwarding MPLS packets received from the source edge router or another label switch router in such a manner as to preserve the protocol type indicator of the packet transport protocol of each received MPLS packet; and
    at the destination edge router, recognizing the protocol type indicator of the transport protocol of the MPLS packets received from the label switch router, and segregating the user MPLS packets from non-user MPLS packets.

12. A method as described in claim 11, wherein the step of transmitting the traffic comprises transmitting the non-user MPLS packets of said additional protocol type with the same MPLS labels as user MPLS packets.

13. A method as described in claim 12, wherein the step of segregating the user MPLS packets from non-user MPLS packets comprises segregating, based on said protocol type, MPLS packets having the same MPLS label.

14. A method as described in claim 13, providing transmission of non-user packets from the source edge router to the destination edge router using the same label switched path as for the user MPLS packets.

15. A method as described in claim 11, the method providing transmission of IP traffic.

16. A method as described in claim 11, the method providing transmission of OAM&P (operations, administration, maintenance and provisioning) traffic.

17. A method as described in claim 11, the method providing transmission of signalling traffic.

18. An edge router for an multi-protocol label switch (MPLS) network, including the edge router and at least one label switch router connected by transmission links and using different protocol type indicators of the transported packets for user MPLS packets and non-user MPLS packets of at least one additional protocol type, the router comprising:

means for transmitting the non-user MPLS packets;

means for recognizing the protocol type indicator of the transport protocol of the MPLS packets received from the label switch router; and means for segregating the user MPLS packets from non-user MPLS packets wherein the means for transmitting comprises a multiplexer for multiplexing user and non-user MPLS packets and assigning same MPLS label to the user and non-user packets; wherein the means for segregating the user and non-user MPLS packets comprises a demultiplexer, which provides segregation of said packets based on the assigned protocol type indicators.

19. An edge router as described in claim 18, the router being the source edge router.

20. An edge router as described in claim 18, the router being the destination edge router.

* * * * *